(12) United States Patent
Rivera

(10) Patent No.: US 8,099,900 B2
(45) Date of Patent: Jan. 24, 2012

(54) METHOD FOR PEST ELECTROCUTION WITH DISPOSABLE CONTAINER

(76) Inventor: Adrian Rivera, Whittier, CA (US)

( * ) Notice: Subject to any disclaimer, the term of this patent is extended or adjusted under 35 U.S.C. 154(b) by 415 days.

(21) Appl. No.: 12/406,392

(22) Filed: Mar. 18, 2009

(65) Prior Publication Data

US 2010/0236131 A1 Sep. 23, 2010

(51) Int. Cl.
*A01M 1/22* (2006.01)
*A01M 23/38* (2006.01)

(52) U.S. Cl. ............................................. 43/98; 43/112
(58) Field of Classification Search ................ 43/98, 112
See application file for complete search history.

(56) References Cited

U.S. PATENT DOCUMENTS

| 5,269,091 | A | 12/1993 | Johnson |
| 5,949,636 | A | 9/1999 | Johnson |
| 5,953,853 | A * | 9/1999 | Kim .................. 43/98 |
| 6,009,662 | A * | 1/2000 | Chang .............. 43/112 |
| 6,993,867 | B2 | 2/2006 | Toyota |
| 7,219,466 | B2 * | 5/2007 | Rich et al. .......... 43/98 |
| 7,380,435 | B1 * | 6/2008 | Henderson et al. ......... 73/12.01 |
| 7,832,140 | B2 * | 11/2010 | Wilbanks ............ 43/112 |
| 2008/0216387 | A1 | 9/2008 | Peters |

FOREIGN PATENT DOCUMENTS

| FR | 2689371 A1 * | 10/1993 |
| JP | 2007-167009 | 7/2007 |
| JP | 2007-195507 | 8/2007 |

* cited by examiner

*Primary Examiner* — David Parsley
*Assistant Examiner* — Danielle Clerkley
(74) *Attorney, Agent, or Firm* — Kenneth L. Green

(57) ABSTRACT

A method and apparatus for electrocution and disposal of pests includes a reusable power source and a low cost disposable portion. The reusable power source includes batteries and a circuit to provide a high voltage and low current signal through external leads to the disposable portion, to electrocute small pests without presenting a risk to humans or pets. The disposable portion is constructed from low cost material, for example, cardboard, and may be packaged for sale in a flat folded state, and easily configured into a container with a floor including conducting surfaces connected to the external leads. In one embodiment, the conducting surfaces are formed of a conducting material formed or glued on the floor of the disposable portion and the conducting material further forms internal leads reaching to a male connector surface configured to cooperate with a female connector of the external leads.

19 Claims, 9 Drawing Sheets

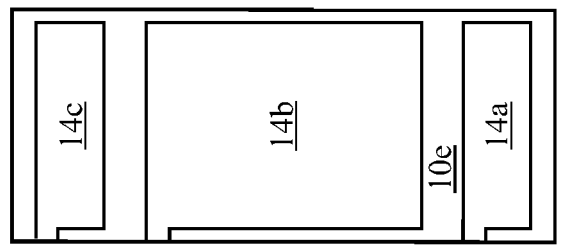
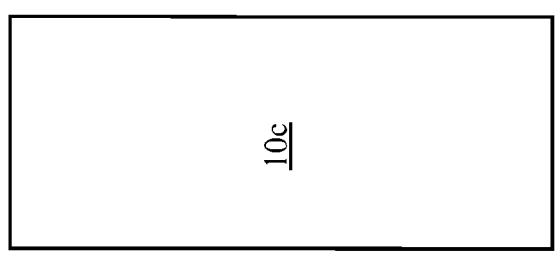
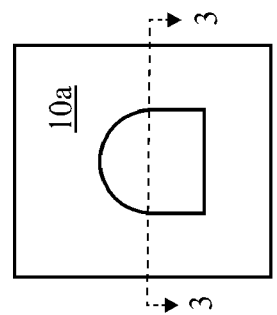
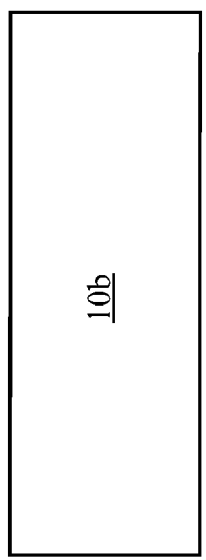
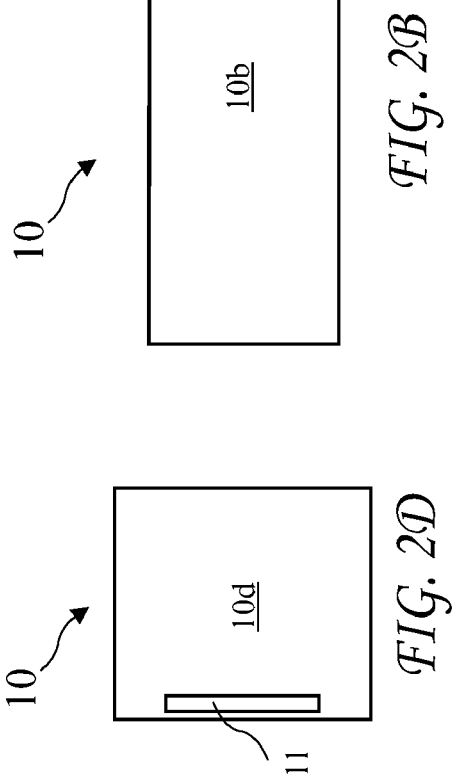
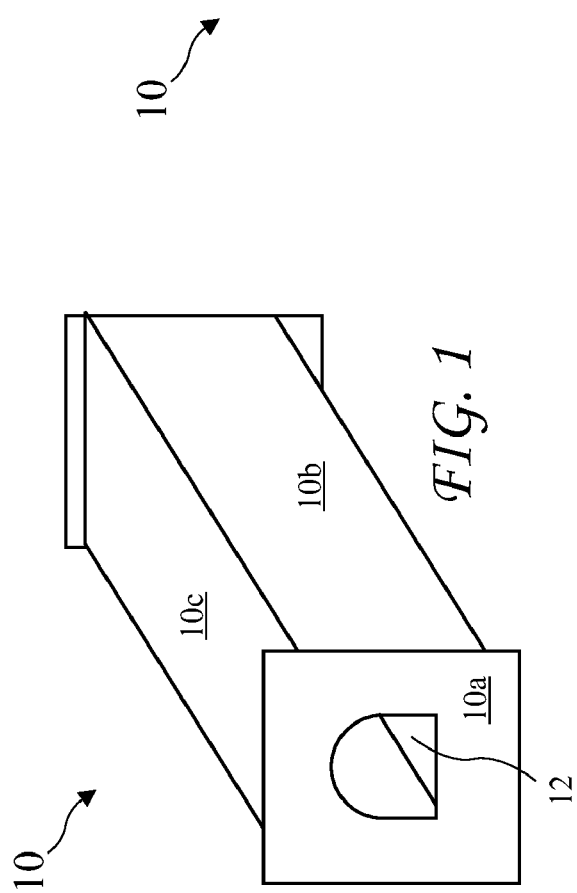

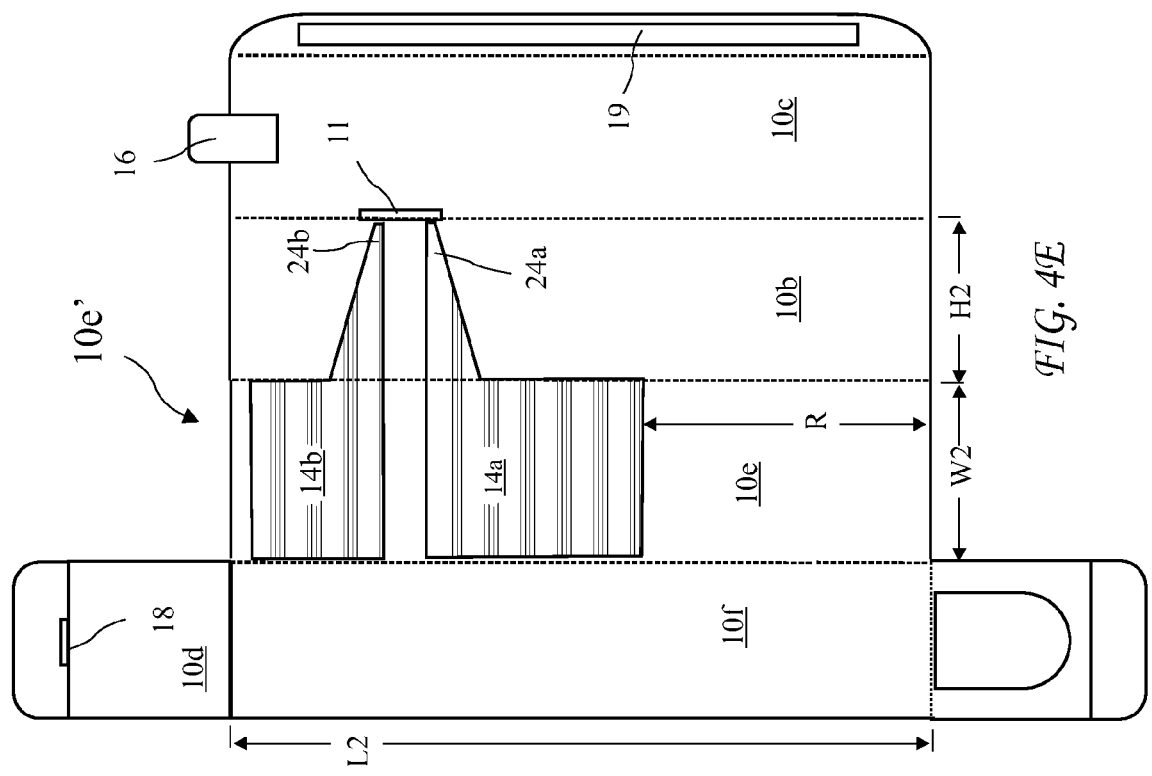
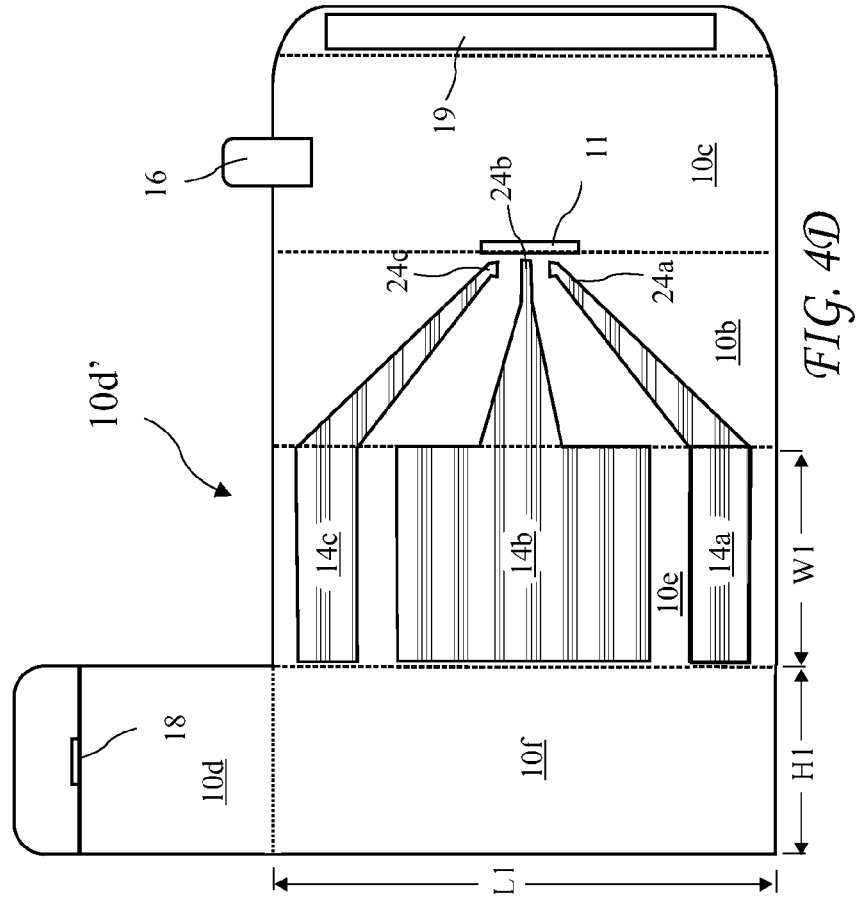

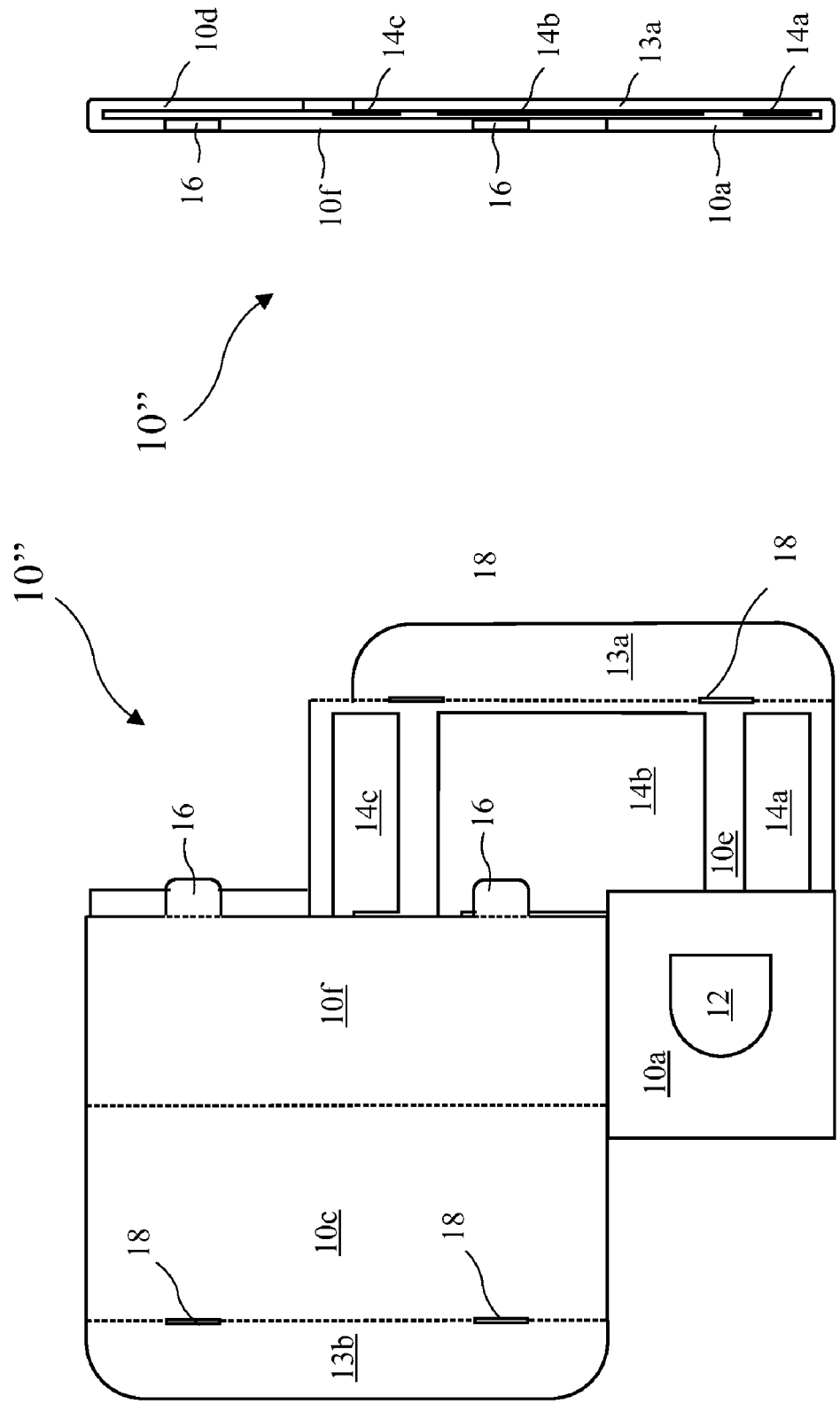

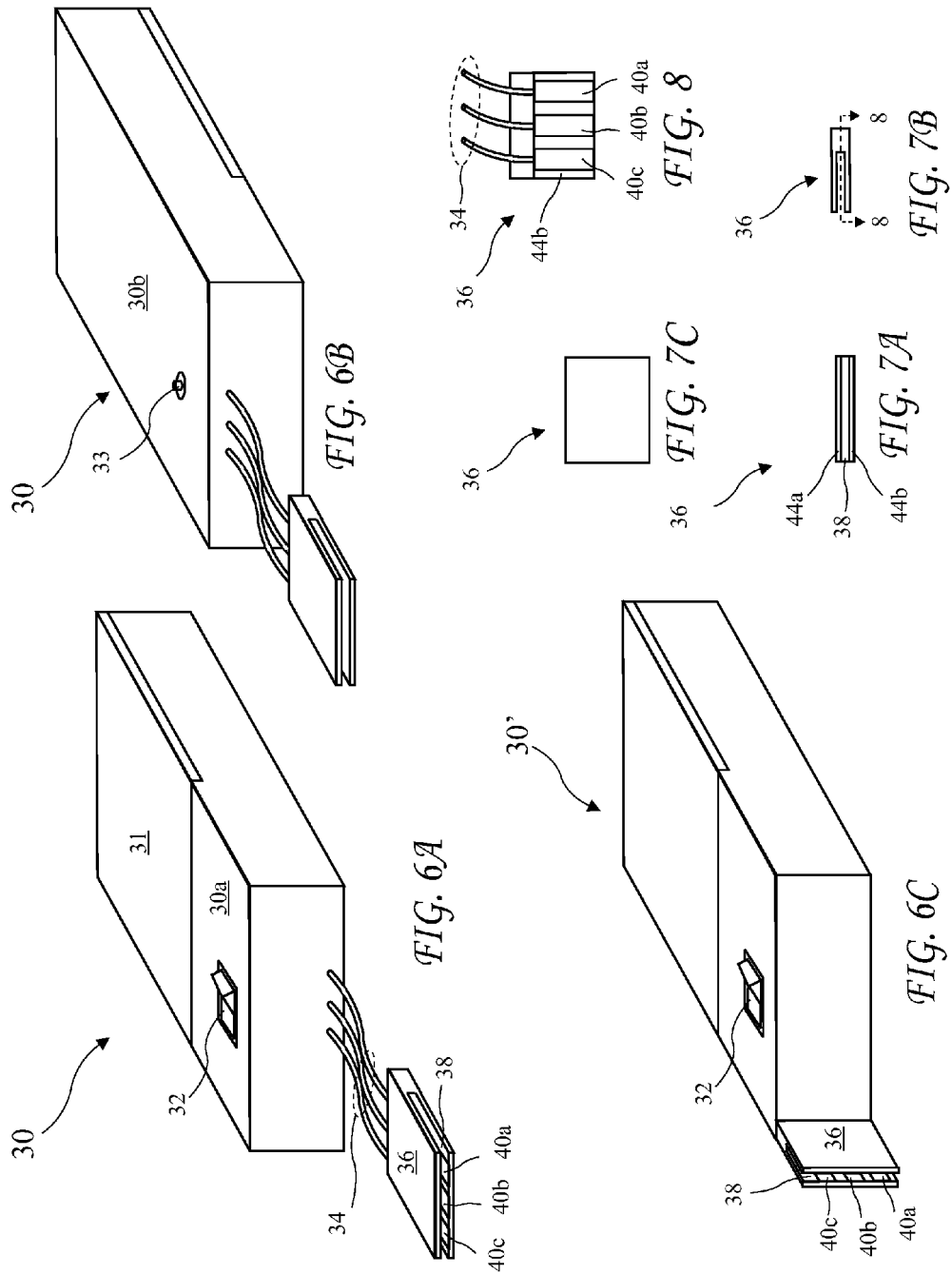

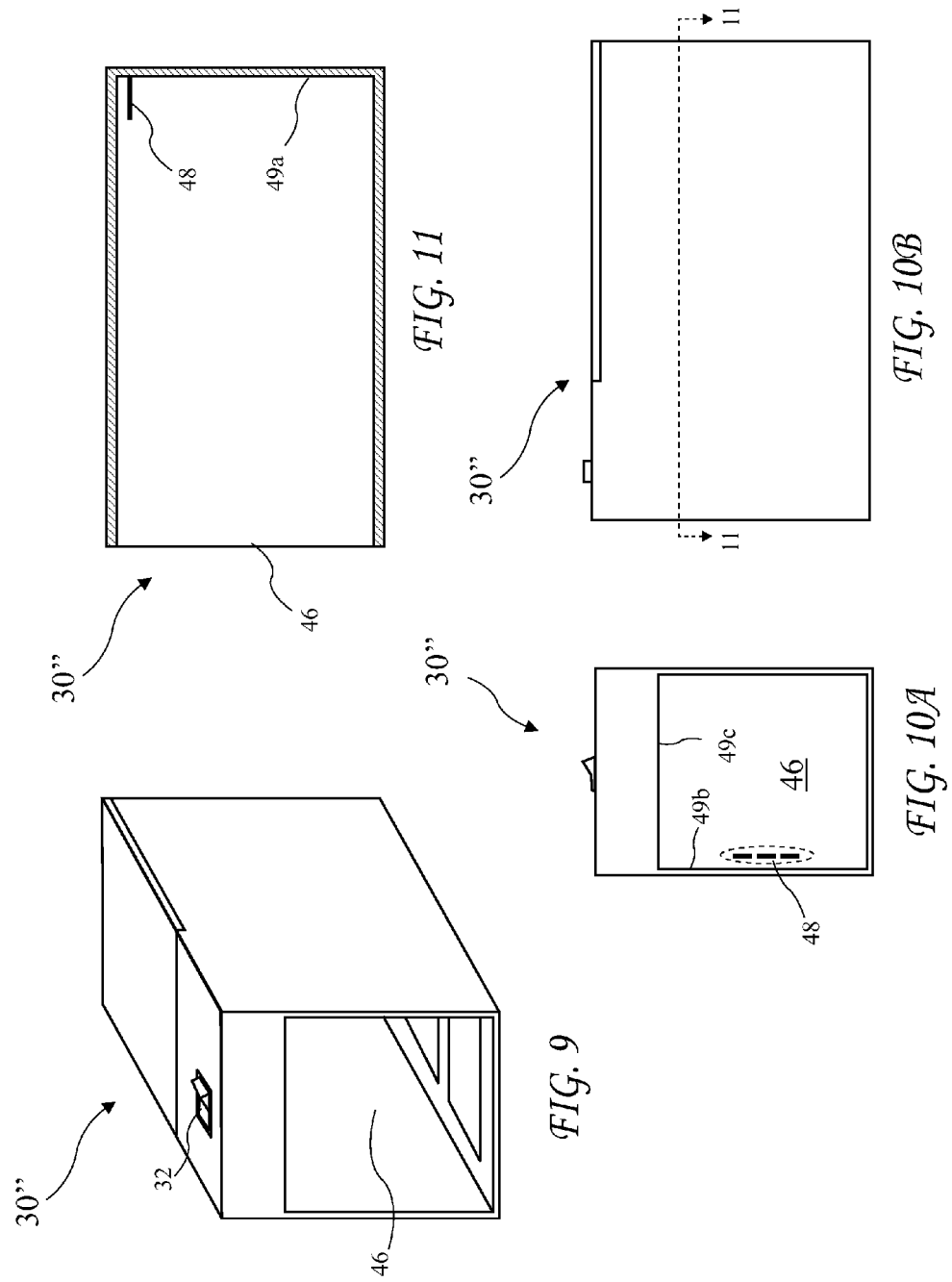

METHOD FOR PEST ELECTROCUTION WITH DISPOSABLE CONTAINER

BACKGROUND OF THE INVENTION

The present invention relates to pest management and in particular to a pest electrocution device with a disposable portion for containing and disposing of a dead pest.

Pests such as rodents present both a nuisance and a heath risk at residences, farms, ranches, and recreational areas. Additionally, urban areas, factories, restaurants, etc. often face rodent infestations. Various mechanical traps are available but generally include some type of grasping mechanism which may be difficult to set and cause discomfort or injury if released on a user's hand. Poisons are also commonly used, but may create their own health risks. For these and other reasons, users are often reluctant to use traditional measures.

U.S. Pat. Nos. 5,269,091 and 5,949,636 disclose portable pest electrocution devices which overcome some of the issues present in mechanical traps and poisons. The '091 and '636 patents describe electrical circuits for sensing the presence of a pest and creating a high voltage signal to electrocute the pest. Unfortunately, both devices require removal of dead pests from the device for disposal. Such removal may involve accidental contact with the dead pest, or an unpleasant experience. Pests are also known to carry diseases, and contact with them may present a heath risk. The '091 and '636 patents are incorporated herein by reference.

BRIEF SUMMARY OF THE INVENTION

The present invention addresses the above and other needs by providing a method and apparatus for electrocution and disposal of pests which includes a reusable power source and a low cost disposable portion. The reusable power source includes batteries and a circuit to provide a high voltage and low current signal through external leads to the disposable portion, to electrocute small pests without presenting a risk to humans or pets. The disposable portion is constructed from low cost material, for example, cardboard, and may be packaged for sale in a flat folded state, and easily configured into a container with a floor including conducting surfaces connected to the external leads. In one embodiment, the conducting surfaces are formed of a conducting material formed or glued on the floor of the disposable portion and the conducting material further forms internal leads reaching to a male connector surface configured to cooperate with a female connector of the external leads.

In accordance with one aspect of the invention, there is provided a method for electrocution and disposal of pests. The method includes providing a power source providing a high voltage and low current signal for electrocution of the pests without presenting risks to humans and a low cost disposable container. Leads are connected from the power source to the low cost disposable container, the leads having a female connector and the low cost disposable container having a male connector. The power supply is switched on and the user waits for a pest to be electrocuted. After the pest has been electrocuted, the power supply is switch OFF and the leads are disconnected from the low cost disposable container. The low cost disposable container containing the electrocuted pest is then disposed of without requiring handling the dead pest.

In accordance with another of the invention, there is provided a low cost disposable container disconnectably connectable to a high voltage and low current power source. The low cost disposable container is foldable to a flat form for packaging and configurable into a container for use. The low cost disposable container includes conducting areas for making contact with the pest to electrocute the pest, and in one embodiment, to sense the presence of the pest. The container contacts and extensions connecting the conducting areas to the container contacts are preferably integrally formed as a thin layer of electrically conductive material glued to the interior of the low cost disposable container or formed on the interior of the low cost disposable container. The interior of the low cost disposable container may be formed from a cutout of a flat sheet and is preferably formed from plastic or a paper product and more preferably from a paper product. The low cost disposable container may thus be disposed of after each use.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1 is a perspective view of a low cost disposable container according to the present invention.

FIG. 2A is a front view of the low cost disposable container.

FIG. 2B is a side view of the low cost disposable container.

FIG. 2C is a top view of the low cost disposable container.

FIG. 2D is a rear view of the low cost disposable container.

FIG. 3 is a cross-sectional view of the low cost disposable container taken along line 3-3 of FIG. 2A.

FIG. 4D shows a fourth cutout according to the present invention suitable for construction of the low cost disposable container for a large rodent.

FIG. 4E shows a fifth cutout according to the present invention suitable for construction of the low cost disposable container for a small rodent.

FIG. 5A shows a top view of the low cost disposable container in a flat folded form suitable for retail packaging according to the present invention.

FIG. 5B shows an edge view of the low cost disposable container in the flat folded form suitable for retail packaging according to the present invention.

FIG. 6A is a top perspective view of a high voltage, low current, power source with leads and a female connector according to the present invention.

FIG. 6B is a bottom perspective view of the high voltage, low current, power source with leads and a female connector according to the present invention.

FIG. 6C is a top perspective view of a second high voltage, low current, power source with a female connector attached directly to the power source according to the present invention.

FIG. 7A is a front view of the female connector according to the present invention.

FIG. 7B is a side view of the female connector according to the present invention.

FIG. 7C is a top view of the female connector according to the present invention.

FIG. 8 is a cross-sectional view of the female connector according to the present invention taken along line 7-7 of FIG. 7B.

FIG. 9 is a perspective view of a second power source according to the present invention having a mouth for receiving the low cost disposable container.

FIG. 10A is a front view of the second power source.

FIG. 10B is a side view of the second power source.

FIG. 11 is a cross-sectional view of the second power source taking along line 11-11 of FIG. 10B.

Corresponding reference characters indicate corresponding components throughout the several views of the drawings.

DETAILED DESCRIPTION OF THE INVENTION

Figure 4A:
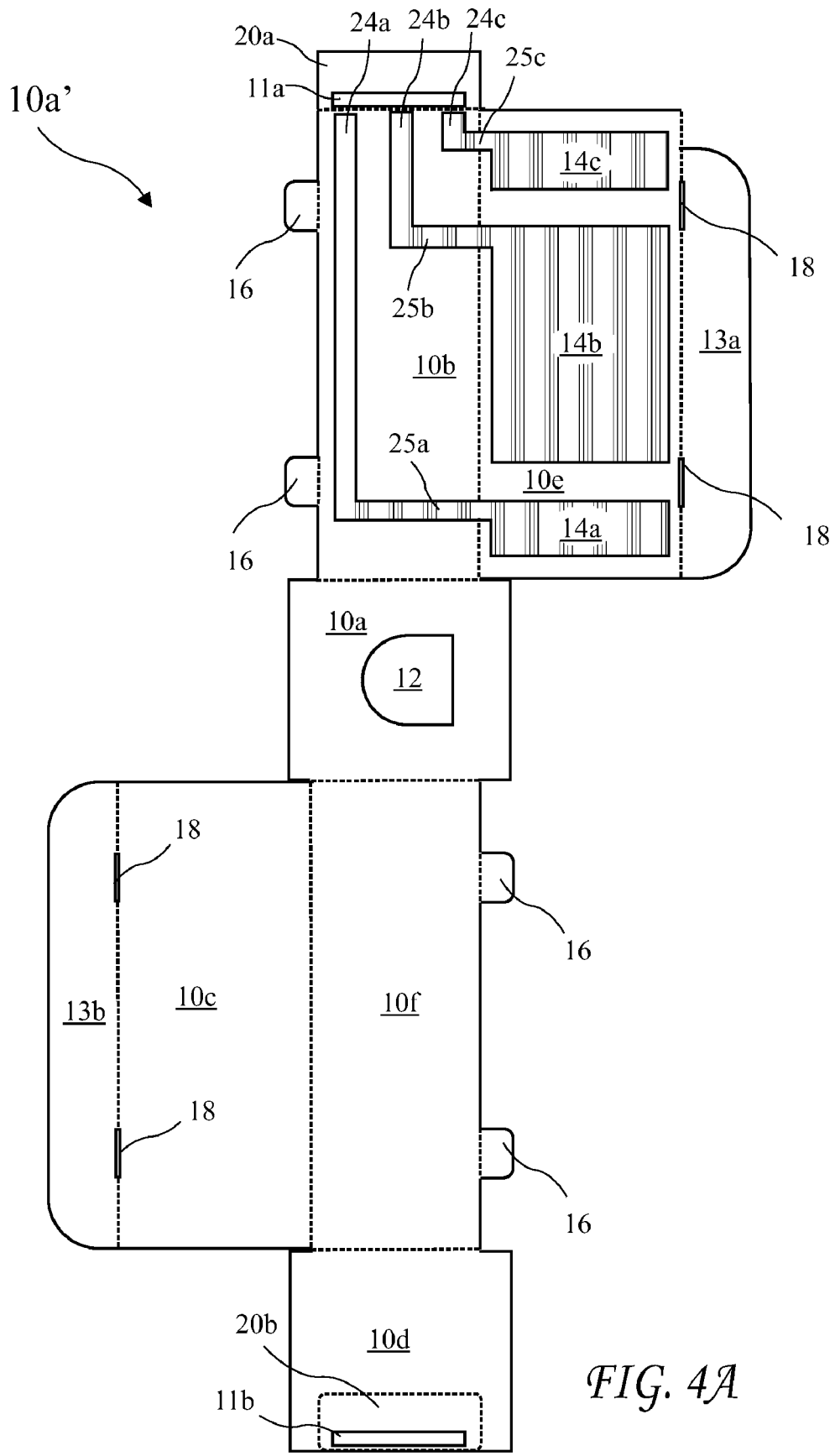
FIG. 4A shows a cutout according to the present invention suitable for construction of the low cost disposable container.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

A perspective view of a low cost disposable container 10 according to the present invention is shown in FIG. 1, a front view of the low cost disposable container 10 showing the front 10a of the low cost disposable container 10 is shown in FIG. 2A, a side view of the low cost disposable container 10 showing the right side 10b of the low cost disposable container 10 is shown in FIG. 2B, a top view of the low cost disposable container 10 showing the top 10c of the low cost disposable container 10 is shown in FIG. 2C, and a rear view of the low cost disposable container 10 showing the rear 10d of the low cost disposable container 10 is shown in FIG. 2D. The low cost disposable container 10 is connected to a power source 30 (see FIG. 6) to provide apparatus for electrocuting pests, and in particular, small rodents. The low cost disposable container 10 thus has walls comprising the front 10a, the right side 10b, the top 10c, the rear 10d, the floor 10e, and the left side 10f (not shown).

The low cost disposable container 10 is preferably constructed from plastic or a paper product and more preferably from a paper product, and may be folded into a flat folded form for packaging for sale. Paper construction is preferred over plastic because rodents are often more comfortable around paper products and odors released by plastics may repel rodents. In the instance of either material, the electric quality of the container 10 is preferably provided by applying a conductive material to the paper or plastic material used to construct the container.

The low cost disposable container 10 includes an entry 12 in the front 10a allowing pests to enter the low cost disposable container 10. The rear 10d includes a passage 11 allowing insertion of a connector 36 (see FIG. 6). The connector 36 includes spaced apart connector contacts 40a-40c (see FIG. 8) which electrically connect with spaced apart container contacts 24a-24c to electrically connect the power source 30 to the low cost disposable container 10.

A cross-sectional view of the low cost disposable container 10 taken along line 3-3 of FIG. 2A is shown in FIG. 3. Three conducting areas 14a, 14b, and 14c reside on a floor 10e of the low cost disposable container 10. The conducting areas 14a, 14b, and 14c are preferably a metal foil glued to the floor 10e or a coating deposited on the floor 10e. Each of the conducting areas 14a, 14b, and 14c is preferably connected to the power source 30 by separate electrical connections and cooperate with the power source 30 to provide sensing and electrocution functions. The power source 30 senses the resistance between the first conducting area 14a and second conducting area 14 to sense the presence of a pest in the low cost disposable container 10. Once the presence of the pest is sensed, a high voltage and low current signal is connected between the first and second conducting areas 14a and 14b, and between the second and third conducting areas 14b and 14c, thereby electrocuting the pest when the pest contacts both the first and second conducting areas 14a and 14b or contacts both the second and third conducting areas 14b and 14c.

A cutout 10a' according to the present invention suitable for construction of the low cost disposable container 10 is shown in FIG. 4A. The cutout 10a' may be cut out from any flat sheet, and is preferably cut out from a paper product or a plastic, and more preferably cut out from a paper product. The cutout 10a' includes a bonding tab 20a and a bonding area 20b for bonding to form a closed flat folded form 10" (see FIGS. 5A and 5B). The cutout 10a' further includes tabs 16 and cuts 18 which cooperate for configuring the flat folded form 10" into the low cost disposable container 10.

The conducting areas 14a, 14b, and 14c are highlighted by shading in FIG. 4, and extensions (or conducting paths) 25a, 25b, and 25c of the conducting areas 14a, 14b, and 14c electrically connect the conducting areas 14a, 14b, and 14c to spaced apart container contacts 24a, 24b, and 24c provided to make electrical contact with the spaced apart lead contacts 40a, 40b, and 40c (see FIG. 8). The extensions 25a, 25b, and 25c may be any electrically conductive structure, for example, wire leads, or conductive material glued or formed on the cutout 10', but are preferably conductive material glued or formed on the cutout 10', and more preferably, the conducting areas 14a, 14b, and 14c, the extensions 25a, 25b, and 25c, and the spaced apart lead contacts 40a, 40b, and 40c are all glued or formed as a single step and are continuous layer of conductive material glued or formed as a single step. For example, the conducting areas 14a, 14b, and 14c, the extensions 25a, 25b, and 25c, and the spaced apart lead contacts 40a, 40b, and 40c may all be a metal (for example aluminum) glued onto the cutout 10a'. The spaced apart container contacts 24a, 24b, and 24c may alternatively be connected to the conducting areas 14a, 14b, and 14c by wire leads, but at greater manufacturing cost.

Figure 4B:
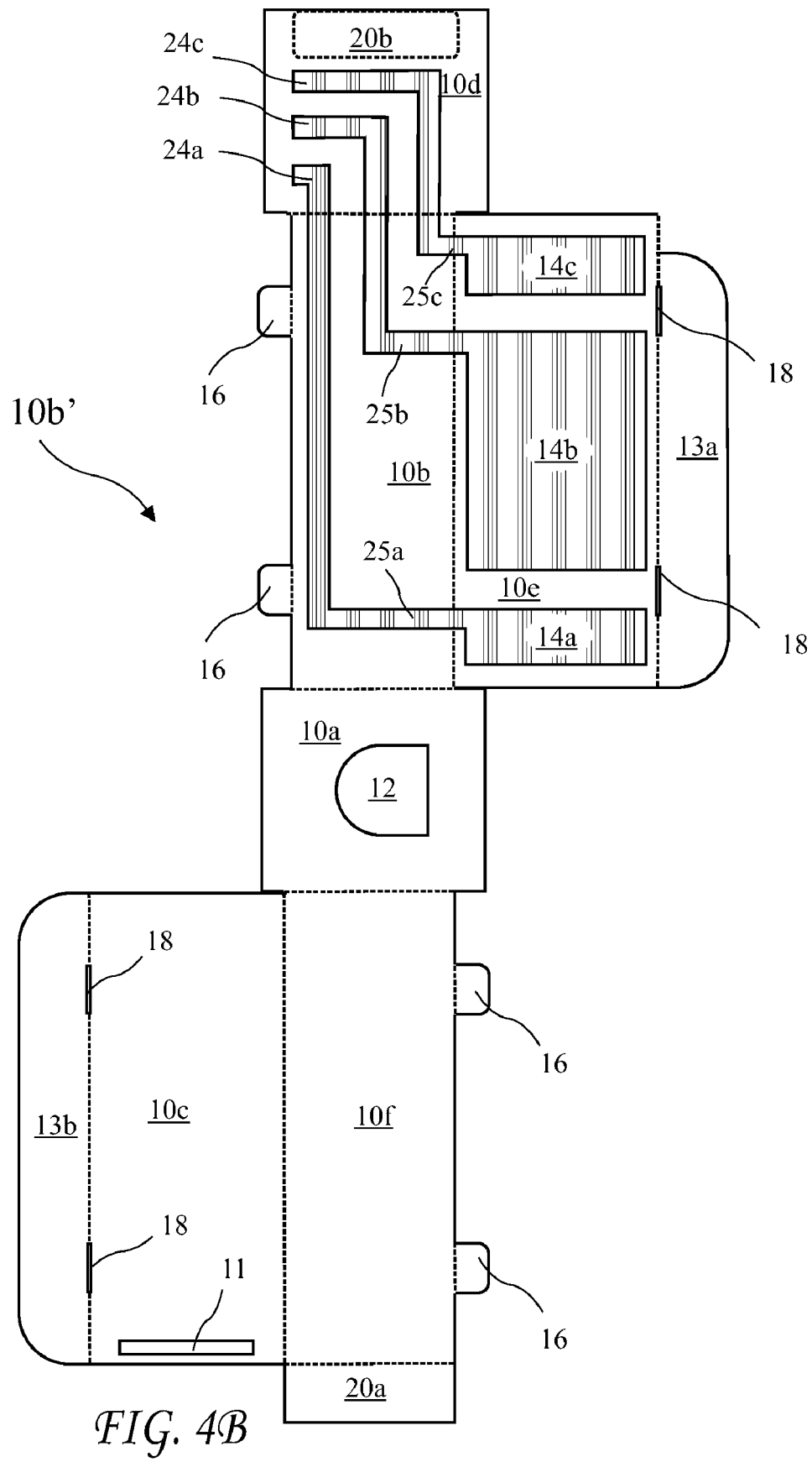
FIG. 4B shows a second cutout according to the present invention suitable for construction of the low cost disposable container.

A second cutout 10b' according to the present invention suitable for construction of the low cost disposable container is shown in FIG. 4B. The cutout 10b' is similar to the cutout 10a' (see FIG. 4A) except that the spaced apart container contacts 24a, 24b, and 24c reside on the end 10d.

Figure 4C:
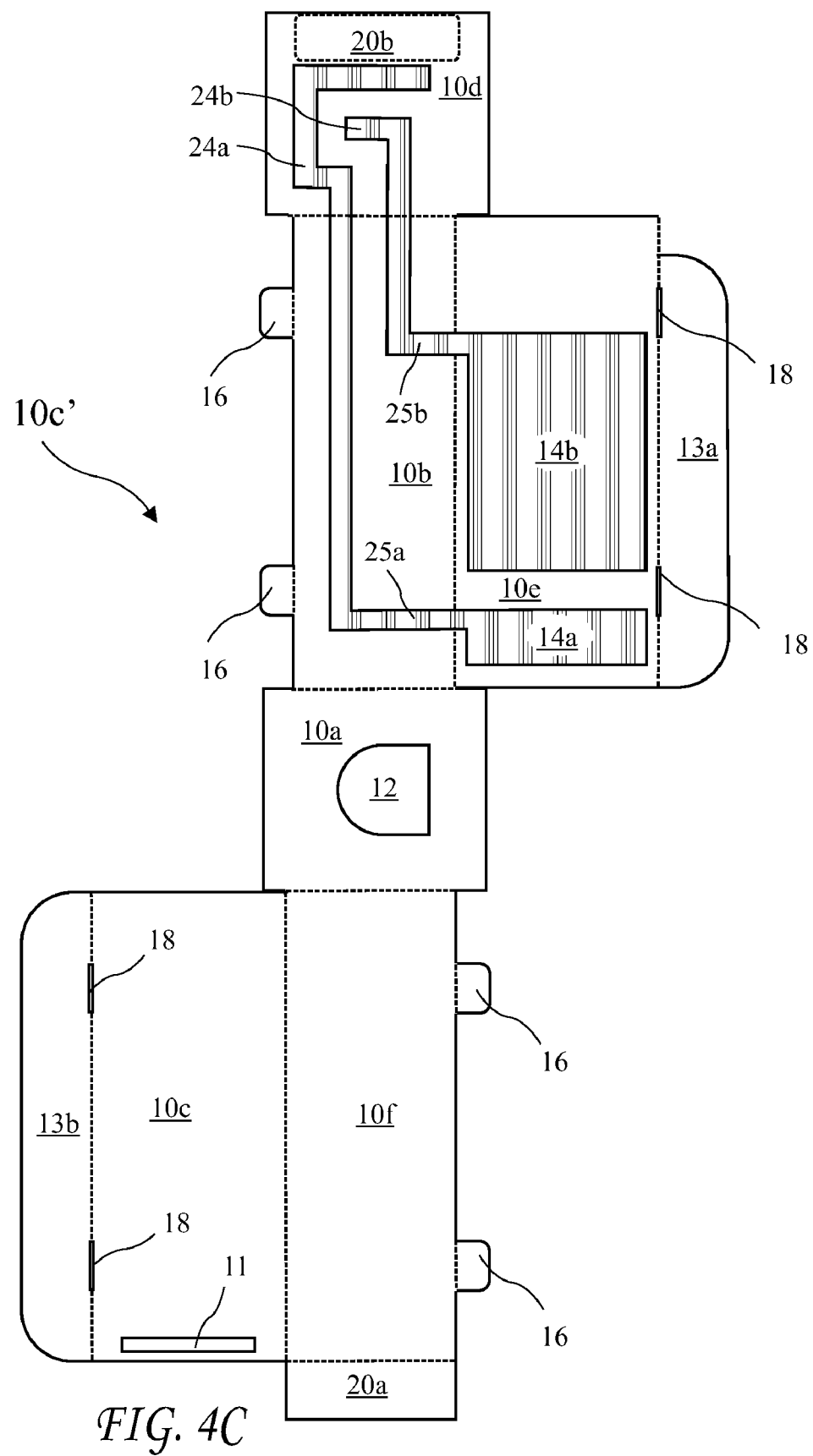
FIG. 4C shows a third cutout according to the present invention suitable for construction of the low cost disposable container.

A third cutout 10c' according to the present invention suitable for construction of the low cost disposable container is shown in FIG. 4C. The cutout 10c' is similar to the cutout 10a' (see FIG. 4A) except that the conducting area 14c, the extensions 25c, and the container contact and 24c eliminated, and the remaining spaced apart container contacts 24a and 24b reside on the end 10d.

A fourth cutout 10d' according to the present invention suitable for construction of the low cost disposable container for a large rodent is shown in FIG. 4D. The cutout 10d' includes tab 16 for engaging slot 18, and adhesive 19 for attachment to form the low cost disposable container. The mouth 11 is on the top surface 10c the container. The container 10d' has a length L1, a width W1, and a height H1. The length L1 is preferably approximately 210 mm, the width W1 is preferably 93 mm, and the height H1 is preferably approximately 80 mm.

A fifth cutout 10e' according to the present invention suitable for construction of the low cost disposable container for a small rodent is shown in FIG. 4E. The cutout 10e' includes tab 16 for engaging slot 18, and adhesive 19 for attachment to form the low cost disposable container. The mouth 11 is on the top surface 10c the container. The container 10e' has a length L2, a width W2, and a height H2. The length L2 is preferably approximately 156 mm, the width W2 is preferably 45 mm, and the height H2 is preferably approximately 40 mm. The conducting areas 14a and 14b are recessed approximately a distance R from the entry to prevent or resist a user making contact with the conducting areas 14a and 14b and being shocked. The recess R is preferably approximately 70 mm.

A top view of the low cost disposable container in a flat folded form 10''' suitable for retail packaging, according to the present invention, is shown in FIG. 5A and an edge view of the low cost disposable container in the flat folded form 10''' suitable for retail packaging is shown in FIG. 5B. The cutout 10a''', 10b''', or 10c''' is folded to overlap and glue (or otherwise adhere) the bonding tab 20a and a bonding area 20b for bonding to form a closed flat folded form 10'''.

A top front perspective view of a high voltage, low current, power source 30 according to the present invention is shown in FIG. 6A and a bottom perspective view of the power source 30 is shown in FIG. 6B. The power source 30 includes an ON/OFF switch 32 on a top surface 30a and a safety switch 33 on a bottom surface 30b. The safety switch 33 is preferably a simple plunger type switch which disables the power supply 30 when the power supply is not lying on a flat surface ready for use. For example, the power supply 30 is disabled when lifted to prevent accidental shocks to a user. Leads 34 and a female connector 36 are connected to the power source 30 for connection to the low cost disposable container 10.

A top perspective view of a second high voltage, low current, power source 30' according to the present invention is shown in FIG. 6C. The female connector 36 attached directly to the power source 30'.

A front view of the female connector 36 according to the present invention is shown in FIG. 7A, a side view of the female connector 36 is shown in FIG. 7B, a top view of the female connector 36 is shown in FIG. 7C. And a cross-sectional view of the female connector 36 taken along line 8-8 of FIG. 7B is shown in FIG. 8. The connector 36 is a split female connector in that the connector contacts 40a, 40b, and 40c reside on a second lip 44b facing a first lip 44a, the lips 44a and 44b separated by a split (or slot) 38, and thus are not on an exterior surface of the connector 36. Although the connector 36 is generally inserted into the low cost disposable container 10 through the passage 11 to electrically connect the power source to the low cost disposable container 10.

The connector 36 is called a female connector even though the container 10 is shown with a mouth 11 (see FIG. 2D) for the connector 36 to be inserted into because the electrical contacts 24a-24c reside on an interior surface of the connector 36 to prevent or reduce the chance of shocking a user. While such female connector is preferred, a pest electrocution device having a power source with a male connector, for example prongs for insertion into the container 10, is also intended to come within the scope of the present invention.

A perspective view of a third power source 30'' according to the present invention, having a mouth 46 having a back 49a, side 49b, and roof 49c for receiving the low cost disposable container 10, is shown in FIG. 9, a front view of the third power source 30'' is shown in FIG. 10A, a side view of the third power source 30'' is shown in FIG. 10B, and a cross-sectional view of the second power source taking along line 11-11 of FIG. 10B is shown in FIG. 11. The mouth 46 allows the low cost disposable container 10 to be inserted into the third power source 30'' for use, and to be removed for disposal. Contacts 48 reside on or near the back 49a of the interior of the third power source 30'' for making electrical contact with the low cost disposable container 10. Alternatively, the low cost disposable container 10 may include male contacts extending from the inserted end of the low cost disposable container 10 for insertion into a female connector inside the third power source 30''.

Figure 12:
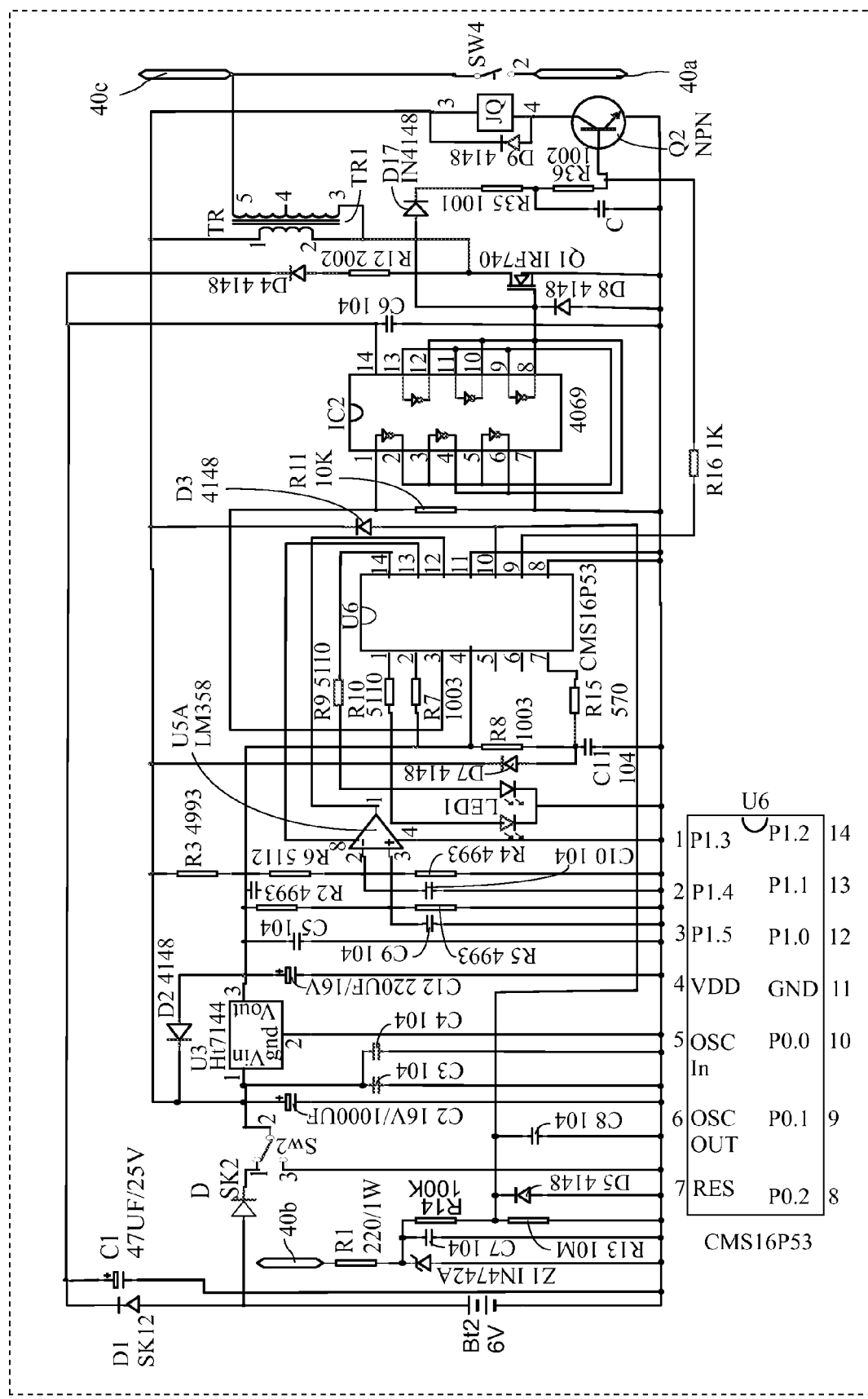
FIG. 12 is a diagram of a circuit providing sensing, and a high voltage and low current signal according to the present invention suitable for use in the power source.

A diagram of a preferred circuit providing sensing and a high voltage and low current signal according to the present invention is shown in FIG. 12. The circuit is suitable for use in the power source, although other circuits, including those discloses in U.S. Pat. Nos. 5,269,091 and 5,949,636 incorporated by reference above, are also suitable. While the power source is preferably battery powered, the power source may also be a plug in power source adapted to plug into a typical wall outlet, for example, 115 or 120 volt AC power. The power source may also be configured to accept either battery or wall outlet power.

While the invention herein disclosed has been described by means of specific embodiments and applications thereof, numerous modifications and variations could be made thereto by those skilled in the art without departing from the scope of the invention set forth in the claims.

I claim:

1. A method for electrocution and disposal of pests, the method comprising: providing a power source providing a high voltage and low current signal for electrocution of the pests; electrically connecting leads from the power source to a low cost disposable container; laying a bottom surface of the power source on a flat surface, the contact of the bottom surface of the power source with the flat surface depressing a safety switch residing on the bottom surface of the power source to enable the power source; waiting for a pest to be electrocuted; disconnecting the leads from the low cost disposable container; and disposing of the low cost disposable container containing the electrocuted pest; wherein the method further includes obtaining the low cost disposable container in a flat unfolded form, the flat unfolded form including: at least two flat electrically conducting areas residing on a surface of the flat unfolded form; at least two flat conducting paths electrically connected to the at least two conducting areas, the at least two conducting paths reaching from the at least two conducting areas to a location for connecting to the electrically connecting leads; and the at least two conducting areas and the at least two conducting paths residing flatly on the flat unfolded form; and folding the low cost disposable container into a box having an opening for the pest to enter.

2. The method of claim 1, further including:
switching ON the power supply before waiting for the pest to be electrocuted; and
switching OFF the power supply after waiting for the pest to be electrocuted.

3. The method of claim 1, wherein electrically connecting the power source to the low cost disposable container comprises connecting leads from the power source having a female connector to a male connector of the low cost disposable container.

4. The method of claim 3, wherein connecting the leads from the power source to the low cost disposable container comprises inserting the female connector having a slotted connector mouth with spaced apart lead contacts on one interior surface of the mouth into an opening in the low cost disposable container to place the spaced apart lead contacts in electrical contact with spaced apart container contacts inside the low cost disposable container.

5. The method of claim 4, wherein connecting the leads from the power source to the low cost disposable container comprises inserting the female connector having a slotted connector mouth with spaced apart lead contacts on one interior surface of the mouth into an opening in the low cost disposable container to place the spaced apart lead contacts in electrical contact with spaced apart container contacts residing on an interior surface of the low cost disposable container.

6. The method of claim 5, wherein connecting the leads from the power source to the low cost disposable container comprises inserting the female connector having a slotted connector mouth with spaced apart lead contacts on one interior surface of the mouth into an opening in the low cost disposable container to place the spaced apart lead contacts in electrical contact with spaced apart container contacts comprising conductive material deposited on an interior surface of the low cost disposable container.

7. The method of claim 6, wherein connecting the leads from the power source to the low cost disposable container comprises inserting the female connector having a slotted connector mouth with spaced apart lead contacts on one interior surface of the mouth into an opening in the low cost disposable container to place the spaced apart lead contacts in electrical contact with spaced apart container contacts comprising conductive material deposited on an interior surface of the low cost disposable container, the conductive material also forming conducting areas on a floor of the low cost disposable container for making electrical contact with the pest.

8. The method of claim 5, wherein connecting the leads from the power source to the low cost disposable container comprises inserting the female connector having a slotted connector mouth with spaced apart lead contacts on one interior surface of the mouth into an opening in the low cost disposable container to place the spaced apart lead contacts in electrical contact with spaced apart container contacts comprising conductive material glued to an interior surface of the low cost disposable container.

9. The method of claim 8, wherein connecting the leads from the power source to the low cost disposable container comprises inserting the female connector having a slotted connector mouth with spaced apart lead contacts on one interior surface of the mouth into an opening in the low cost disposable container to place the spaced apart lead contacts in electrical contact with spaced apart container contacts comprising conductive material glued to an interior surface of the low cost disposable container, the conductive material also forming conducting areas on a floor of the low cost disposable container for making electrical contact with the pest.

10. The method of claim 1, wherein electrically connecting the power source to a low cost disposable container comprises inserting the low cost disposable container into a housing of the power source to connect cooperating electrical connectors.

11. The method of claim 1, wherein the at least two conducting areas and the at least two conducting paths are selected from the group consisting of a metal foil glued to the flat sheet cutout and a coating deposited on the flat sheet cutout.

12. The method of claim 1, wherein:
the power source includes a mouth for receiving the low cost disposable container and spaced apart flat contacts reach forward from the back of the mouth; and
electrically connecting leads from the power source to a low cost disposable container comprises sliding the low cost disposable container into the mouth such that one of a side and a roof of the low cost disposable container, is sandwiched between the spaced apart flat contacts and one of the side and the roof of the mouth.

13. The method of claim 12, wherein electrically connecting leads from the power source to a low cost disposable container comprises sliding the low cost disposable container into the mouth such that a side of the low cost disposable container, is sandwiched between the spaced apart flat contacts and the side of the mouth.

14. The method of claim 1, wherein connecting the leads from the power source to the low cost disposable container comprises inserting a second lip of a lead connector into an opening in the low cost disposable container, the lead connector having a flat slotted connector mouth separating the second lip from a first lip, and the second lip of the lead connector having spaced apart lead contacts on a flat interior surface facing the first lip, the lead connector sandwiching a part of the low cost disposable container selected from the group consisting of a top, a right side, a left side, and a rear of the low cost disposable container between the second lip and the first lip, to place the spaced apart lead contacts in electrical contact with spaced apart container contacts on an inside surface of the low cost disposable container.

15. A method for electrocution and disposal of pests, the method comprising:
providing a power source providing a high voltage and low current signal for electrocution of the pests;
engaging a first split connector electrically connected to the power source to a second connector electrically connected to a low cost disposable container by:
sliding the first split connector over a wall of the low cost disposable container with a first lip of the first split connector sliding on an exterior surface of the wall and a second lip of the first split connector entering the low cost disposable container through a mouth and sliding on an interior surface of the wall; and
making electrical contact between connector contacts on an inside surface of the second lip of the first split connector and container contacts on the interior surface of the wall;
switching the power source to ON;
waiting for a pest to be electrocuted;
switching the power source to OFF;
disconnecting the first split connector from the low cost disposable container; and
disposing of the low cost disposable container containing the electrocuted pest.

16. A method for electrocution and disposal of pests, the method comprising:
providing a flat sheet cutout comprising:
a floor, a top, a right side, a left side, and a rear;
a passage through the flat sheet cutout for insertion therethrough of an electrical connector;
at least two flat electrically conducting areas residing on the floor of the flat sheet cutout;
at least two flat conducting paths electrically connected to the at least two conducting areas, the at least two conducting paths reaching from the at least two conducting areas to a location for connecting to the electrical connector; and
the at least two conducting areas and the at least two conducting paths residing flatly on the flat sheet cutout;
folding the flat sheet cutout to form a low cost disposable container;

providing a power source providing a high voltage and low current signal to the electrical connector for electrocution of the pests;

inserting the electrical connector through the passage in the flat sheet cutout to make electrical contact with the at least two conducting paths;

waiting for a pest to be electrocuted;

disconnecting the electrical connector from the low cost disposable container; and disposing of the low cost disposable container containing the electrocuted pest.

17. The method of claim 16, wherein the at least two conducting areas and the at least two conducting paths are selected from the group consisting of a metal foil glued to the flat sheet cutout and a coating deposited on the flat sheet cutout.

18. The method of claim 16, wherein inserting the electrical connector through the passage in the flat sheet cutout to make electrical contact with the at least two conducting paths comprises sandwiching one of the top, the right side, the left side, and the rear of the flat sheet cutout by the electrical connector.

19. The method of claim 16, wherein inserting the electrical connector through the passage in the flat sheet cutout to make electrical contact with the at least two conducting paths comprises inserting a portion of the electrical connector carrying spaced apart contacts into the interior of the low cost disposable container and positioning a portion of the electrical connector carrying no contacts outside the low cost disposable container.

* * * * *